US012809756B2

(12) United States Patent
Brown et al.

(10) Patent No.: US 12,809,756 B2
(45) Date of Patent: Nov. 24, 2026

(54) ENHANCED TESTING OF EDGE GATEWAYS WITH A VIRTUAL NETWORK FUNCTION

(71) Applicant: CenturyLink Intellectual Property LLC, Broomfield, CO (US)

(72) Inventors: Andrea Brown, Monroe, LA (US); Cory Sawyer, Hudson, MA (US); Joshua Faucher, Cumberland, RI (US); Gregory Johnson, Malden, MA (US); Matt Holway, Round Hill, VA (US); Gene Clark, Marysville, OH (US)

(73) Assignee: CenturyLink Intellectual Property LLC, Denver, CO (US)

( * ) Notice: Subject to any disclaimer, the term of this patent is extended or adjusted under 35 U.S.C. 154(b) by 330 days.

(21) Appl. No.: 18/504,796

(22) Filed: Nov. 8, 2023

(65) Prior Publication Data

US 2024/0152447 A1 May 9, 2024

Related U.S. Application Data

(60) Provisional application No. 63/382,975, filed on Nov. 9, 2022.

(51) Int. Cl.
*G06F 9/455* (2018.01)
*G06F 8/60* (2018.01)
(Continued)

(52) U.S. Cl.
CPC ...... *G06F 11/3688* (2013.01); *G06F 11/3684* (2013.01); *H04L 43/50* (2013.01);
(Continued)

(58) Field of Classification Search
CPC .... G06F 11/3668; G06F 11/3684; G06F 8/63; G06F 9/45558; G06F 2009/45562;
(Continued)

(56) References Cited

U.S. PATENT DOCUMENTS 9,912,573 B1 * 3/2018 Zemlerub ............... H04L 43/50
10,700,946 B2 * 6/2020 Kojukhov ........... H04L 41/5032
(Continued)

FOREIGN PATENT DOCUMENTS

WO WO-2017144432 8/2017

OTHER PUBLICATIONS

Racha Gouareb et al., Virtual Network Functions Routing and Placement for Edge Cloud Latency Minimization, Oct. 2018, [Retrieved on Sep. 22, 2026]. Retrieved from the internet: <URL: https://ieeexplore.ieee.org/stamp/stamp.jsp?tp=&arnumber=8463518> 12 Pages (2346-2357) (Year: 2018).*
(Continued)

*Primary Examiner* — Anibal Riveracruz

(57) ABSTRACT

A method related to remotely testing virtual network functions with edge gateways may include providing an application for receiving user inputs for testing a virtual network function (VNF); receiving, via the application, a first user input associated with adding an image of a virtual machine instance to the application; downloading, via the application, the image based on the first user input; receiving, via the application, a second user input associated with instantiating a service associated with the virtual machine instance; instantiating, via the application, the service based on the second user input; receiving, via the application, a third user input associated with testing the VNF with the edge gateway device using the image and the service; and executing, via the application, a test of the VNF with an edge gateway using the image and the service based on the third user input.

19 Claims, 7 Drawing Sheets

(51) Int. Cl.

| | |
|---|---|
| ***G06F 9/50*** | (2006.01) |
| ***G06F 11/30*** | (2006.01) |
| ***G06F 11/34*** | (2006.01) |
| ***G06F 11/36*** | (2025.01) |
| ***G06F 11/3668*** | (2025.01) |
| ***H04L 43/50*** | (2022.01) |
| *G06F 8/61* | (2018.01) |
| *H04L 41/0895* | (2022.01) |
| *H04L 41/14* | (2022.01) |
| *H04L 41/22* | (2022.01) |
| *H04L 41/40* | (2022.01) |

(52) U.S. Cl.
CPC .................. *G06F 8/60* (2013.01); *G06F 8/61* (2013.01); *G06F 9/45558* (2013.01); *G06F 11/3668* (2013.01); *H04L 41/0895* (2022.05); *H04L 41/14* (2013.01); *H04L 41/22* (2013.01); *H04L 41/40* (2022.05)

(58) Field of Classification Search
CPC .......... G06F 8/60; G06F 8/61; G06F 11/3688; G06F 11/3664; H04L 41/40; H04L 41/0266; H04L 41/18; H04L 41/22; H04L 41/5048; H04L 41/5054; H04L 41/0895; H04L 41/14; H04L 43/50; H04L 43/55
See application file for complete search history.

(56) References Cited

U.S. PATENT DOCUMENTS

| | | | | |
|---|---|---|---|---|
| 10,785,109 | B1 * | 9/2020 | Sidebottom | H04L 67/51 |
| 2014/0250215 | A1 | 9/2014 | Bowen | |
| 2017/0006083 | A1 * | 1/2017 | McDonnell | H04L 41/12 |
| 2017/0244606 | A1 * | 8/2017 | Htay | H04L 41/0895 |
| 2018/0121335 | A1 * | 5/2018 | Cillis | G06F 11/3672 |
| 2018/0337931 | A1 * | 11/2018 | Hermoni | H04L 63/0823 |
| 2019/0028350 | A1 * | 1/2019 | Yeung | H04L 41/0813 |
| 2019/0104047 | A1 * | 4/2019 | Tejaprakash | H04L 43/50 |
| 2020/0004665 | A1 | 1/2020 | Shinge | |
| 2020/0267072 | A1 * | 8/2020 | Prasad | H04L 45/64 |
| 2020/0310950 | A1 * | 10/2020 | Mueller | G06F 11/3409 |
| 2020/0344144 | A1 * | 10/2020 | Lee | H04L 12/4641 |
| 2021/0011823 | A1 * | 1/2021 | Guim Bernat | G06F 11/263 |
| 2021/0224092 | A1 * | 7/2021 | Wang | G06F 16/955 |
| 2022/0201447 | A1 * | 6/2022 | Asawa | G06F 8/60 |
| 2022/0350632 | A1 * | 11/2022 | Shaikh | H04L 67/10 |
| 2023/0082606 | A1 * | 3/2023 | Jebbar | G06F 11/3006 714/38.1 |

OTHER PUBLICATIONS

International Preliminary Report on Patentability, dated May 22, 2025, Int'l Appl No. PCT/US2023/037022, Int'l Filing Date Nov. 8, 2023; 11 pgs.
International Search Report and Written Opinion of the International Searching Authority, dated Feb. 20, 202, Int'l Appl. No. PCT/US2023/037022, Int'l Filing Date Nov. 8, 2023; 6 pgs.

* cited by examiner

ENHANCED TESTING OF EDGE GATEWAYS WITH A VIRTUAL NETWORK FUNCTION

CROSS-REFERENCE TO RELATED APPLICATION

This application is related to and claims priority under 35 U.S.C. § 119(e) from U.S. Patent Application No. 63/382,975, filed Nov. 9, 2022, titled "ENHANCED TESTING OF EDGE GATEWAYS WITH A VIRTUAL NETWORK FUNCTION," the entire content of which is incorporated herein by reference for all purposes.

TECHNICAL FIELD

Embodiments of the present invention generally relate to systems and methods for testing edge gateways with a virtual network function.

BACKGROUND

Network customers may test virtual machine functionality with edge gateways for compatibility with network edge gateways. Testing often requires the edge gateway hardware to be configured at a customer premise, and testing may require weeks or months.

SUMMARY

A method for remotely testing virtual network functions with edge gateway devices may include providing, by at least one processor, an application associated with receiving user inputs for testing a virtual network function (VNF) with an edge gateway device remote from the VNF; receiving, by the at least one processor, via the application, a first user input associated with adding an image of a virtual machine instance to the application; downloading, by the at least one processor, via the application, the image based on the first user input; receiving, by the at least one processor, via the application, a second user input associated with instantiating a service associated with the virtual machine instance; instantiating, by the at least one processor, via the application, the service based on the second user input; receiving, by the at least one processor, via the application, a third user input associated with testing the VNF with the edge gateway device using the image and the service; and executing, by the at least one processor, via the application, a test of the VNF with the edge gateway device using the image and the service based on the third user input.

A system for remotely testing virtual network functions with edge gateway devices may include memory coupled to at least one processor, the at least one processor configured to: provide an application associated with receiving user inputs for testing a virtual network function (VNF) with an edge gateway device remote from the VNF; receive, via the application, a first user input associated with adding an image of a virtual machine instance to the application; download, via the application, the image based on the first user input; receive, via the application, a second user input associated with instantiating a service associated with the virtual machine instance; instantiate, via the application, the service based on the second user input; receive, via the application, a third user input associated with testing the VNF with the edge gateway device using the image and the service; and execute, via the application, a test of the VNF with the edge gateway device using the image and the service based on the third user input.

A non-transitory computer-readable storage medium may include instructions to cause at least one processor for remotely testing virtual network functions with edge gateway devices, upon execution of the instructions by the at least one processor, to: provide an application associated with receiving user inputs for testing a virtual network function (VNF) with an edge gateway device remote from the VNF; receive, via the application, a first user input associated with adding an image of a virtual machine instance to the application; download, via the application, the image based on the first user input; receive, via the application, a second user input associated with instantiating a service associated with the virtual machine instance; instantiate, via the application, the service based on the second user input; receive, via the application, a third user input associated with testing the VNF with the edge gateway device using the image and the service; and execute, via the application, a test of the VNF with the edge gateway device using the image and the service based on the third user input.

DETAILED DESCRIPTION

Figure 1:
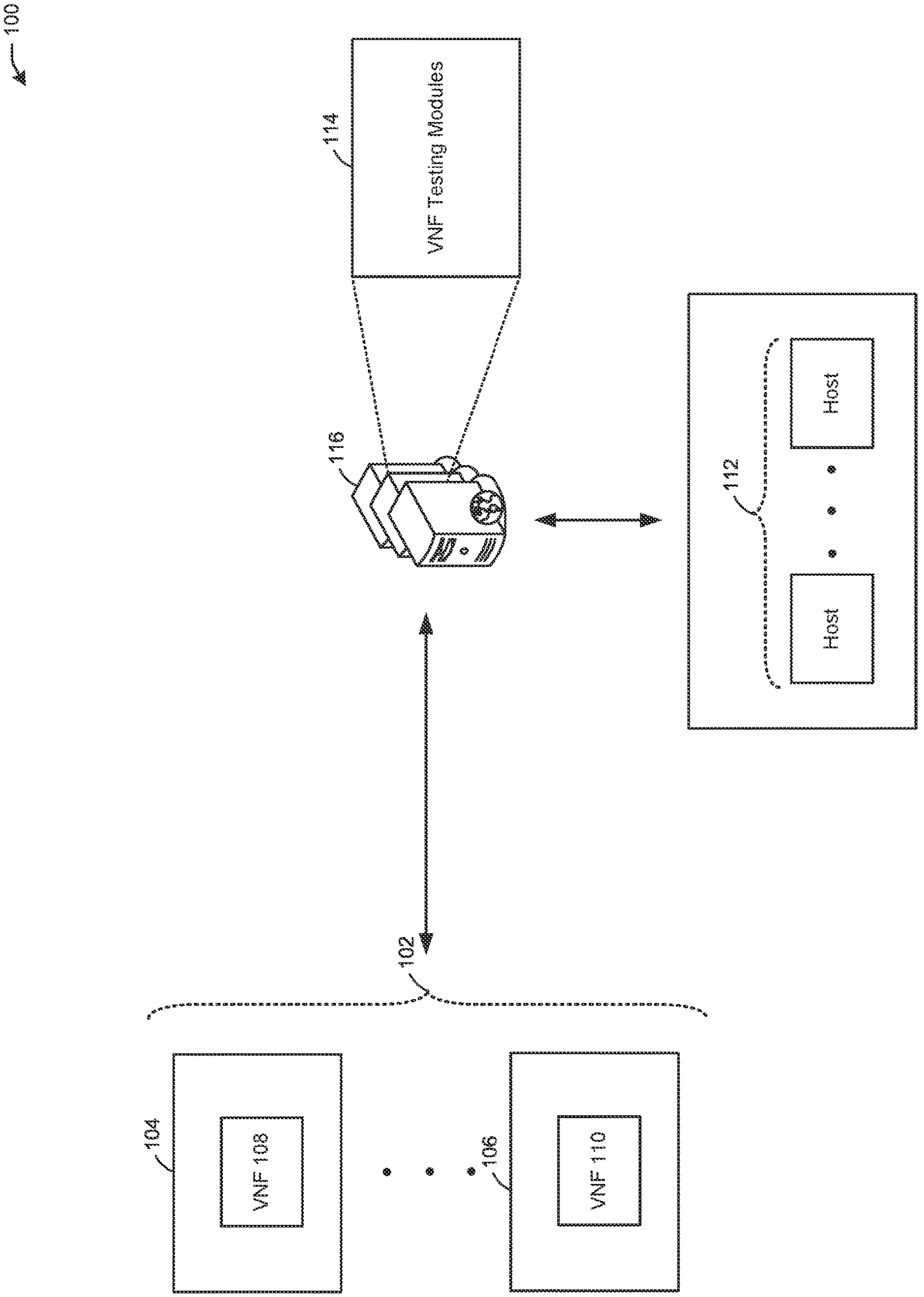
FIG. 1 illustrates an example system for testing virtual network functions with edge gateway devices, in accordance with one embodiment.

Aspects of the present disclosure involve systems, methods, and the like, for enhanced testing of edge gateways with a virtual network function.

Some communications network customers may want to test their virtual network functionality with an edge gateway of a communications network (e.g., to determine whether an edge gateway is a solution for the customer's virtual network function). Tests currently require sending all this hardware to a customer premise. To test a virtual network function (VNF), hardware often is sent to a customer so they can test it with the VNF, often requiring significant field testing over weeks or months.

There is therefore a need for enhanced testing of edge gateways with a virtual network function.

In one or more embodiments, an application may enable a communications network user to test a VNF with an edge gateway of the communications network without requiring the edge gateway hardware to be built and configured at the customer premise. An application may allow the customer to add an image to use for virtual machine instances (e.g., a virtual machine image that behaves like a computer). The application may allow users to run manual tests, automated tests, schedule tests, manage images (e.g., for virtual machine instances) loaded to the edge gateway, view test metrics, and manage users that have access to the application test portal. The application may function as a software "sandbox" that allows users to test their machine image/environment without any new hardware required to be installed.

In one or more embodiments, the application may allow users to upload an image of their virtual machine. The application will facilitate service instantiation using the virtual machine image, create logical connections for the VNF on physical hardware, and perform tests, including customer-defined tests.

In one or more embodiments, the application provides a premise virtualization concept that allows users to "try before buying" by not requiring the edge gateway hardware to be purchased prior to testing VNFs with the edge gateways. The application allows users to upload a virtual machine image and reserve available hardware racks for testing. Instantiating a service may include application programming interface (API) calls to software that creates procedures to communicate with the testing environment. The application may facilitate spinning up the VNF, creating and testing the gateway, and the like without the user's involvement. The physical devices and their connections used in the testing may be set up (e.g., in a lab remote from customer premises), and the logical connections may be established by the application based on the user's selected inputs. The establishment of the connections may be automated in this manner. The tests may be templatized, and testing may be scheduled periodically (e.g., allowing for repetition), including the reservation of an environment and performance of the tests at different days, times, etc.

In one or more embodiments, the application may store only one copy of a machine image at a time, but users may use an image as many times as needed for separate virtual machine instances. The application may use checksums to verify images (e.g., checksums are unique identifiers assigned to images). To add an image, a user may sign into the application, select "add image," and complete corresponding fields such as image name, uniform resource locator (URL), checksum type (e.g., MD5, etc.), host type (e.g., type of edge gateway), required CPU count, required RAM, required disk memory, and the like. Table 1 below shows example fields and their descriptions for adding an image.

TABLE 1

Fields for Adding an Image:

| Field | Description |
|---|---|
| Name | Type a name for the image. |
| URL | Type the URL where the user can download the image. User cannot have duplicate URLs for images.<br>Note: The URLs must be publicly accessible. Application cannot download images stored at secured or protected URLs. |
| Checksum Type | Select MD5 or SHA256 for the image checksum type. |
| Checksum | Type or paste the code that identifies the image. Application checks the code against the checksum in the image. If the checksum values do not match, the adding process fails. |
| Host Type | Select Edge Gateway. |
| Required CPU | Select the number of CPUs required for the virtual machine. |
| Required RAM | Select the amount of RAM (in MB) required for the virtual machine. |
| Required Disk | Select the amount of storage (in GB) required for the virtual machine. |
| Job Name | (Optional) Type a name for the job to add an image. If user does not give this task a custom job name, one is automatically generated. For example, a generated job name could be 5b59ac87-2dc6-4010-b681-cb975046501.<br>A custom job name is easier to locate in lists and lines of code. |
| Custom Job Identifier | (Optional) Type an identifier of the image adding job. If you do not give this task a custom job identifier, one is automatically generated. For example, a generated Job ID could be 45239414-79e4-462b-92ae-f00eacda6e67.<br>A custom job identifier is easier to locate in lists and lines of code. |

In one or more embodiments, after the user has entered the fields to add an image with the application, the user may select "start download" to cause the application to add the image based on the entered data from Table 1.

In one or more embodiments, the application may enable users to create services that represent their virtual machine configuration. Services may have multiple instances using the same image multiple times, or different images for each instance. Services may be configured as one of the following VNF type combinations: one router, one router and any of a bring your own firewall, one sessions border controller, one monitor, or one bring your own IT payload, and/or multiple bring your own IT payload. The create a service, the user may sign into the application, select "services," select "instantiate service," and in the instantiate services window of the application, may enter a name for the service and a description of the service. The user may select "add," and in the instantiate services window, may complete the fields shown below in Table 2.

TABLE 2

Fields for Instantiating a Service:

| Field | Description |
|---|---|
| Name | Type the name of the instance. User can have multiple instances within a service. For example, a router and a monitor within one service. |
| Environment | Select the Edge Gateway device for the environment. |
| Service | Select Basic VNF. |
| CloudInit User Data Script | Type or paste the cloud-init script for the service. The script is for automated commands.<br>Note: This is required if for user to use the Cloudinit Mime Type field. |
| CloudInit Mime Type | Type one of the following cloud-init mime types for the corresponding user data script:<br>Cloud Boothook<br>Cloud Config<br>Include URL<br>Include URL Once<br>Part Handler<br>Shell Script<br>Upstart Job<br>Text Plain<br>None<br>Note: This is required if you use the Cloudinit User Data Script field. |

TABLE 2-continued

| Fields for Instantiating a Service: | |
|---|---|
| Field | Description |
| VNF Type | Type one of the following VNF types for the instance:<br>Router<br>BYOFW (bring your own firewall)<br>SBC (session border controller)<br>Monitor<br>BYOITP (bring your own IT payload)<br>BYOITP Standalone (bring your own IT payload) |
| Ephemeral Block Storage (GB) | Select the amount of extra storage for the instance. This storage is assigned to this instance and does not add or deduct from the total storage configured for the image. |
| Image 1 | Select the image to use for this instance. Be aware of the functionality and limitations of the image in relation to the VNF type assigned to the instance. |

After entering the fields of Table 2, a user may select "save task," and optionally may add instances as service components before instantiating the service. Selecting "instantiate" will result in the application creating the service and displaying the progress in a running job window.

In one or more embodiments, the application may allow users to test functionality and correct configurations by retrieving instance console URLs and running tests. A user may use the application to run tests with parameters using a parser. The application may evaluate test results (e.g., with XPath, JSON path, or REGEX parser types and expressions).

In one or more embodiments, the application may retrieve console URLs. To retrieve an instance console URL, a user may sign into the application, select "services," enter a name or keywords into a search field to filter services presented, and select the desired service from the corresponding list of presented services. The user may select "run test" on the selected service, and complete the fields of Table 3 below in a "run test" window.

TABLE 3

| Fields to Run Test: | |
|---|---|
| Field | Description |
| Test | Select Get Console to obtain a URL to view the VNF console. |
| Authorize Images On Pass | Select one of the following options:<br>True to authorize images assigned to the service after a successful test.<br>False to leave the assigned images as unauthorized.<br>If images are already authorized, no actions are taken to the images. |

Optionally, to add success parameters to the test to ensure that the virtual machine is working as intended, the user may select "add evaluations" and complete the fields of Table 4 below.

TABLE 4

| Fields to Add Evaluations: | |
|---|---|
| Field | Description |
| Output Key | Select consoleURL. This parameter evaluates the page response. |
| Comparison Value | Select Equals, Less Than, or Greater Than, and then type the page response value. |
| Parser Type | Select the parser type for the parser expression evaluation. Refer to Testing Virtual Machines for more information.<br>Note: This is required if user uses the Parser Expression field. |
| Parser Expression | Type the parser expression, according to the Parser Type selected, for the evaluation.<br>Note: This is required if user uses the Parser Type field. |

Optionally, to add a job name and identifier o the test to simplify locating the test, the user may select "advanced options" and complete the fields of Table 5 below.

TABLE 5

| Advanced Options for Tests: | |
|---|---|
| Field | Description |
| Job Name | Type a name for the console retrieval job. If user does not give this task a job name, one is automatically generated. For example, a generated job name could be 5b59ac87-2dc6-4010-b681-cb975046501.<br>A custom job name is easier to locate in lists and lines of code. |
| Custom Job Identifier | Type an identifier of the console retrieval job. If user does not give this task a custom job identifier, one is automatically generated. For example, a generated Job ID could be 45239414-79e4-462b-92ae-f00eacda6e67.<br>A custom job identifier is easier to locate in lists and lines of code. |

Then, the user may select "run test" based on the user inputs. The application may display progress of the test as it runs, and once the test has completed, may indicate whether the test passes or fails.

In one or more embodiments, the user may select "services," select the service that was tested, and select the instance that was tested. The user may select "tests," and select the test that was run. The application may display the test details. From the test details presentation, the user may copy the consoleURL from the outputs, paste the consoleURL into a browser tab address bar, and navigate to the instance console where the user may test the instance console and view details.

In one or more embodiments, the application enables users to perform a hypertext transfer protocol (HTTP) request test on a service. The user may need the following information to perform the test: virtual machine IP address, URL, body, and headers. To perform an HTTP request test on a service, the user may sign into the application, select "services," enter a name or keyword into the search field o filter presented services, and select desired service from the presented services to expand the information presented. The user may select "run test" on the desired service, and the application may present a "run test" window. In the "run test" window, the user may complete the fields of Table 6 below.

TABLE 6

| Fields for Running a Test: | |
|---|---|
| Field | Description |
| Test | Select HTTP Request Test. |
| Authorize Images On Pass | Select one of the following options: True to authorize images assigned to the service after a successful test. False to leave the assigned images as unauthorized. If images are already authorized, no actions are taken to the images. |
| vmIp | Type the IP address for the virtual machine user is testing. |
| Protocol | Select http or https. |
| port | Type the HTTP request port. |
| url | Type the URL for the test. |
| method | Select one of the following methods for the test: GET POST PUT PATCH DELETE If user used the body and headers fields, this should correspond to those entries. Note: This is required if user uses the body and headers fields. |
| body | Type or paste the body of the HTTP request for the test. If user used the method and headers fields, this should correspond to those entries. For example, paste the body of a GET request to test that request in the virtual machine. Note: This is required if user used the method and headers fields. |
| headers | Type or paste the header of the HTTP request for the test. If user used the method and body fields, this should correspond to those entries. For example, if user selected DELETE for the method and pasted the body of that method for body, type the header of that request to test the request in the virtual machine. Note: This is required if user used the method and body fields. |
| allowUn-authorized | Select one of the following options: True to pass a test for an instance with an unauthorized image. False to fail a test for an instance with an unauthorized image. |

Optionally, to add success parameters to a test to ensure that a virtual machine is working as intended, the user may select "add evaluations" and complete the fields of Table 7 below.

TABLE 7

| Fields for Adding Evaluations: | |
|---|---|
| Field | Description |
| Output Key | Select rawResponse. This parameter evaluates the page response. |
| Comparison Value | Select Equals, Less Than, or Greater Than, and then type the page response value. |
| Parser Type | Select the parser type for the parser expression evaluation. Refer to Testing Virtual Machines for more information. Note: This is required if user uses the Parser Expression field. |
| Parser Expression | Type the parser expression, according to the Parser Type selected, for the evaluation. Note: This is required if user uses the Parser Type field. |

Optionally, to add a job name and identifier to the test to simplify locating the test, the user may select "advanced options" and complete the fields of Table 8 below.

TABLE 8

| Fields to Add Evaluations: | |
|---|---|
| Field | Description |
| Job Name | Type a name for the HTTP request test job. If user does not give this task a job name, one is automatically generated. For example, a generated job name could be 5b59ac87-2dc6-4010-b681-cb975046501. A custom job name is easier to locate in lists and lines of code. |
| Custom Job Identifier | Type an identifier of the HTTP request test job. If you do not give this task a custom job identifier, one is automatically generated. For example, a generated Job ID could be 45239414-79e4-462b-92ae-f00eacda6e67. A custom job identifier is easier to locate in lists and lines of code. |

The user may select "run test," the application may run the test, and may display the progress of the test. When the test passes or fails, the application may display an indication of passage or failure accordingly. On a services page, the user may select the service tested, and select the instance tested. On a tests tab, the user may select the task that was run. The application may display the test details, and in the test details, the user may view the test results in an outputs section. The output information and test URLs may be used by the user as needed.

In one or more embodiments, he application may allow a user to perform a Netconf test (e.g., protocol to install, manipulate, and delete network device configurations) on a service, and may require the following information to perform the test: port, username, password, and template. The user may sign into the application, select "services," select a desired service, select "run test" on the selected service, and the application may run the test on the service. The user may enter the fields of Table 9 below.

TABLE 9

| Fields for Running a Test: | |
|---|---|
| Field | Description |
| Test | Select Netconf Test. |
| Authorize Images On Pass | Select one of the following options: True to authorize images assigned to the service after a successful test. False to leave the assigned images as unauthorized. If images are already authorized, no actions are taken to the images. |
| port | Type the Netconf port. |
| user | Type the Netconf username. |
| password | Type the Netconf username password. |

Optionally, the user may add success parameters to the test to ensure that the virtual machine is working as intended. The user may select "add evaluations" and complete the fields of Table 10 below:

TABLE 10

| Fields to Add Evaluations: | |
|---|---|
| Field | Description |
| Output Key | Select rawResponse. This parameter evaluates the page response. |

TABLE 10-continued

Fields to Add Evaluations:

| Field | Description |
|---|---|
| Comparison Value | Select Equals, Less Than, or Greater Than, and then type the page response value. |
| Parser Type | Select the parser type for the parser expression evaluation. Refer to Testing Virtual Machines for more information. Note: This is required if user uses the Parser Expression field. |
| Parser Expression | Type the parser expression, according to the Parser Type selected, for the evaluation. Note: This is required if user uses the Parser Type field. |

Optionally, the user may add a job name and identifier to the test to simplify locating the test, the user may select "advanced options" and complete the fields shown below in Table 11.

TABLE 11

Advanced Options:

| Field | Description |
|---|---|
| Job Name | Type a name for the Netconf test job. If user does not give this task a job name, one is automatically generated. For example, a generated job name could be 5b59ac87-2dc6-4010-b681-cb975046501. A custom job name is easier to locate in lists and lines of code. |
| Custom Job Identifier | Type an identifier of the Netconf test job. If user does not give this task a custom job identifier, one is automatically generated. For example, a generated Job ID could be 45239414-79e4-462b-92ae-f00eacda6e67. A custom job identifier is easier to locate in lists and lines of code. |

The user may select "run test," the application may run the test and present the progress of the test, and when complete, may present results of the test (e.g., passage or failure). On the services tab, the user may select the service tested, the instance tested, and the test that was run. The application may display the test details.

In one or more embodiments, the application may allow users to perform an Ansible test on a service when the user provides the virtual machine's IP address, port, their user-name and password, and playbook (e.g., list of tasks that automatically execute for specified inventory/groups). Table 12 below shows the inputs used for running an Ansible test with the application. Other tests may be selected and run, such as Netconf and HTTP request tests, for example.

TABLE 12

Fields for Running Ansible Test:

| Field | Description |
|---|---|
| Test | Select Ansible Test. |
| Authorize Images On Pass | Select one of the following options: True to authorize images assigned to the service after a successful test. False to leave the assigned images as unauthorized. If images are already authorized, no actions are taken to the images. |
| vmIp | Type the IP address for the virtual machine user is testing. |

TABLE 12-continued

Fields for Running Ansible Test:

| Field | Description |
|---|---|
| port | Type the Ansible port. |
| user | Type the Ansible username. |
| password | Type the Ansible username password. |
| playbook | Type or paste the Ansible playbook. |

Optionally, a user may add success parameters to the Ansible test to ensure that the virtual machine is operating as intended. The success parameters may be added when the user selects "add evaluations" with the application according to the fields of Table 13 below.

TABLE 13

Fields for Adding Evaluations to Ansible Test:

| Field | Description |
|---|---|
| Output Key | Select rawResponse. This parameter evaluates the page response. |
| Comparison Value | Select Equals, Less Than, or Greater Than, and then type the page response value. |
| Parser Type | Select the parser type for the parser expression evaluation. Refer to Testing Virtual Machines for more information. Note: This is required if user uses the Parser Expression field. |
| Parser Expression | Type the parser expression, according to the Parser Type selected, for the evaluation. Note: This is required if user uses the Parser Type field. |

Optionally, a user may select Advanced Options to add a job identifier to the Ansible test according to the fields of Table 14 below.

TABLE 14

Advanced Fields for Ansible Test:

| Field | Description |
|---|---|
| Job Name | Type a name for the Ansible test job. If you do not give this task a job name, one is automatically generated. For example, a generated job name could be 5b59ac87-2dc6-4010-b681-cb975046501. A custom job name is easier to locate in lists and lines of code. |
| Custom Job Identifier | Type an identifier of the Ansible test job. If you do not give this task a custom job identifier, one is automatically generated. For example, a generated Job ID could be 45239414-79e4-462b-92ae-f00eacda6e67. A custom job identifier is easier to locate in lists and lines of code. |

When a user selects "Run Test," the application may run the Ansible test according to the inputs provided by the user, and may present the progress and results of the test.

In one or more embodiments, the application may allow users to delete a service or instance from the application. If an instance in a service is deleted and that is the only instance in the service, the service may be deleted.

In one or more embodiments, the application may allow users to manage images used for virtual machines. The application may enable users to authorize images to indicate that they have been tested and approved once the image has been added via the application. The application may allow users to view details of downloaded images, such as status of authorization, source location, specifications, and checksums. The application may allow users to delete images from the application. The application may allow users to edit image names. The application may allow users to download images for virtual machines and store the images locally. The application may allow users to view jobs such as downloading an image to use for an instance and instantiating a service. The application may present details of a job, such as start and end times, state (e.g., complete, failed, etc.), and activity logs (e.g., debug, information, warning, error).

In one or more embodiments, the application may allow users to create job templates. Job templates may refer to preconfigured parameters for jobs that can be performed immediately or at scheduled times. For example, a user may create a job template to perform Ansible tests on specified machines on a bi-weekly basis. Table 15 below shows the fields used for user inputs for building a job template.

TABLE 15

Job Type Fields:

| Job | Description | Section |
|---|---|---|
| Image download | Download an image. | Adding an Image |
| Create service container | Create a service without any instances. | Creating a Service |
| Instantiate service | Create a service with instances. | Creating a Service |
| Destroy service instance | Delete a service or instance. | Deleting a Service or Instance |
| Test | Test a service. | Testing Virtual Machines |

In one or more embodiments, the application may allow users to start a job from a job template (e.g., to ensure uniform processing). To start a job from a job template, a user may complete the fields of Table 16 below.

TABLE 16

Fields for Starting a Job from a Job Template:

| Field | Description |
|---|---|
| Job Name | Type a name for the job. If user does not give a job a custom name, one is automatically generated. For example, a generated job name could be 5b59ac87-2dc6-4010-b681-cb975046501. A custom job name is easier to identify in the logs. |
| Custom Identifier | Type an identifier for the job. If user does not give the job a custom identifier, one is automatically generated. For example, a generated Job ID could be 45239414-79e4-462b-92ae-f00eacda6e67. A custom job identifier is easier to locate. |
| Job Template | Select the template to use for the job. |
| Schedule Job for Activation | Select Now to start the job now or Schedule to schedule when the job occurs. |

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an example system 100 for testing virtual network functions with edge gateway devices, in accordance with one embodiment.

Referring to FIG. 1, the system 100 may include customer premise devices 102 (e.g., customer premise device 104, customer premise device 106, etc.) including VNFs (e.g., the customer premise device 104 including a VNF 108 and the customer premise device 106 including a VNF 110) that may be tested with host devices 112 (e.g., edge gateway devices) using an application represented by VNF testing modules 114 provided by a remote service 116. The host devices 112 may be physically and logically arranged and configured at a location remote from the customer premise devices 102 such that the VNF 108 and the VNF 110 may be tested on the host devices 112 without the host devices 112 being physically present at the customer premises.

In one or more embodiments, the VNF testing modules 114 may allow the customer premise devices 102 to provide user inputs to add virtual machine images, instantiate services associated with instances of the virtual machine images, test the VNFs with the host devices 112, and the like. Tables 1-16 above show example fields that the VNF testing modules 114 may provide via one or more user interfaces, and that may be entered by the customer premise devices 102.

In one or more embodiments, the application represented by the VNF modules 114 may enable a communications network user to test a VNF with an edge gateway (e.g., the host devices 112) without requiring the edge gateway hardware to be built and configured at the customer premise. The application may allow a customer to add an image to use for virtual machine instances. The application may allow users to run manual tests, automated tests, schedule tests, manage images (e.g., for virtual machine instances) loaded to the edge gateway, view test metrics, and manage users that have access to the application test portal. The application may function as a software "sandbox" that allows users to test their machine image/environment without any new hardware required to be installed.

In one or more embodiments, the application represented by the VNF modules 114 may allow users to upload an image of their virtual machine. The application will facilitate service instantiation using the virtual machine image, create logical connections for the VNF on physical hardware, and perform tests, including customer-defined tests.

In one or more embodiments, the application represented by the VNF modules 114 provides a premise virtualization concept that allows users to "try before buying" by not requiring the edge gateway hardware of the host devices 112 to be purchased prior to testing VNFs with the edge gateways. The application allows users to upload a virtual machine image and reserve available hardware racks for testing. Instantiating a service may include API calls to software that creates procedures to communicate with the testing environment where the host devices 112 are located. The application may facilitate spinning up the VNF, creating and testing the gateway, and the like without the user's involvement. The physical devices and their connections used in the testing may be set up (e.g., in a lab remote from customer premises), and the logical connections may be established by the application based on the user's selected inputs. The establishment of the connections may be automated in this manner. The tests may be templatized, and testing may be scheduled periodically (e.g., allowing for repetition), including the reservation of an environment and performance of the tests at different days, times, etc.

Figure 2:
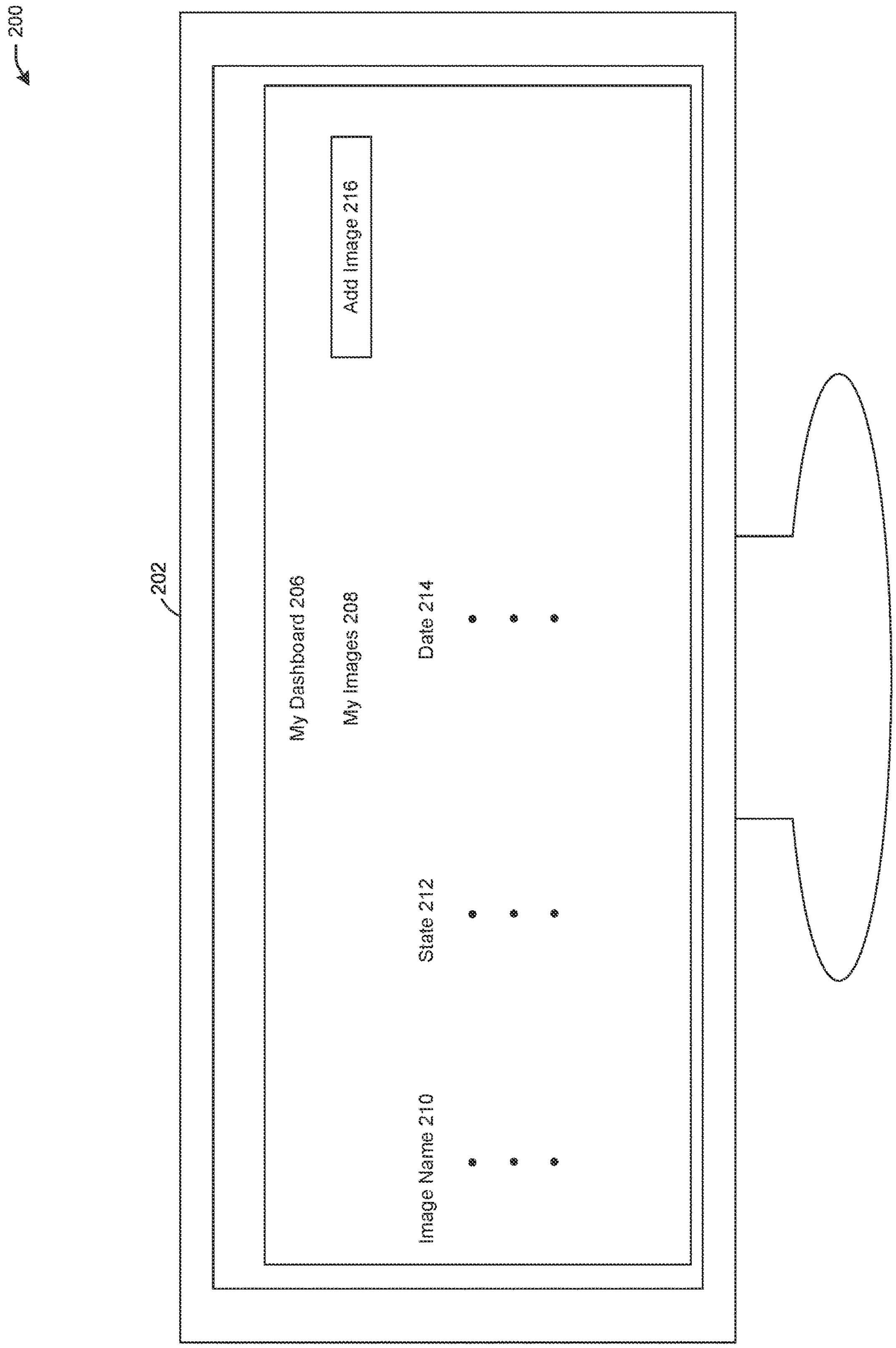
FIG. 2 shows an example dashboard interface of a system for testing virtual network functions with edge gateway devices, in accordance with one embodiment.

FIG. 2 shows an example dashboard interface 200 of a system for testing virtual network functions with edge gateway devices, in accordance with one embodiment.

Referring to FIG. 2, the dashboard interface 200 may be presented by a device 202 using the VNF testing modules 114 of FIG. 1 to allow users to see, add, edit, and remove virtual machine instance images, their state, and their dates. Table 1 above shows fields that a user may input when requesting to add a virtual machine instance image, such as a name 210 for the image, an address (e.g., a URL), state 212 (e.g., authorized, complete, failed, etc.), date 214, the checksum and checksum type, the type of host device (e.g., of the host devices 112 of FIG. 1), and the computer resources needed (e.g., CPU, memory, etc.). A selectable option to add a virtual machine image 216 also may be presented using the dashboard interface 200. The user also may create and name a job for adding an image. Once the user inputs have been provided for adding an image, the VNF testing modules 114 may download the image from the input address, and may add the image based on the configuration specified by the user inputs.

Figure 3:
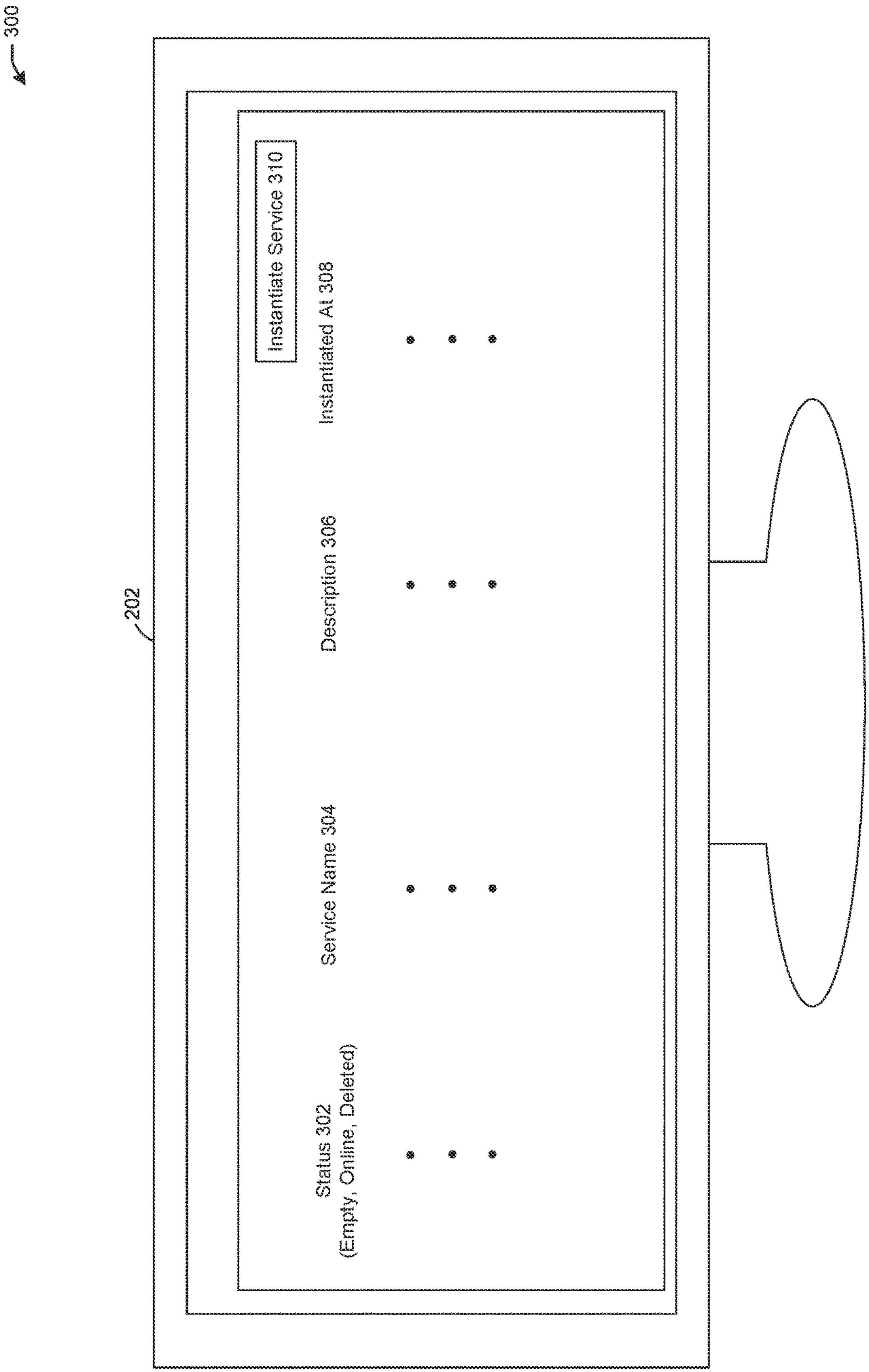
FIG. 3 shows an example services interface of a system for testing virtual network functions with edge gateway devices, in accordance with one embodiment.

FIG. 3 shows an example services interface 300 of a system for testing virtual network functions with edge gateway devices, in accordance with one embodiment.

Referring to FIG. 3, the services interface 300 may be presented using the VNF testing modules 114 of FIG. 1 and the device 202 to allow users to create services that represent a virtual machine configuration. Services can have multiple instances using the same image multiple times or different images for each instance. As shown in FIG. 3, the services interface 300 may show the status 302 of services, their names 304, descriptions 306, and where they have been instantiated 308. When a user requests to instantiate a service (e.g., using a selectable option to instantiate a service 310) from the services interface 300, the user may be prompted to input a service name and description, along with other fields as shown in Table 2 above. The VNF testing modules 114 may create the service based on the user inputs.

Figure 4:
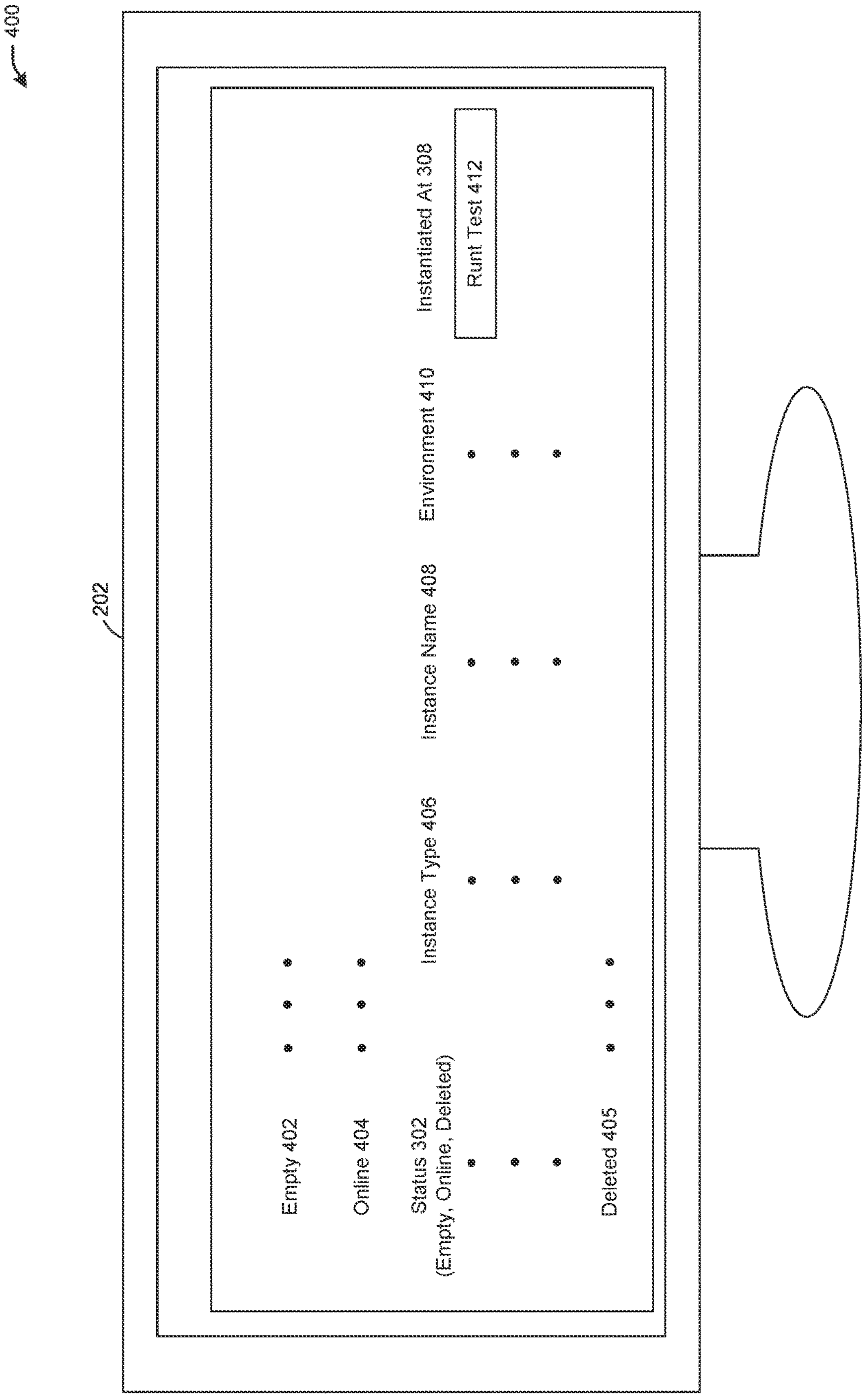
FIG. 4 shows an example test interface of a system for testing virtual network functions with edge gateway devices, in accordance with one embodiment.

FIG. 4 shows an example test interface 400 of a system for testing virtual network functions with edge gateway devices, in accordance with one embodiment.

Referring to FIG. 4, the test interface 400 may be presented using the VNF testing modules 114 of FIG. 1 and the device 202 to allow users to create and execute tests of VNFs with host devices, and to see the progress and result of the tests. For example, as shown in FIG. 4, the test interface 400 may present the status 302 of a test (e.g., empty 402, online 404, deleted 405), an instance type 406 being tested by a test, an instance name 408, a test environment 410, and where the test is instantiated 308. When a user requests to run a test (e.g., using a selectable option 412), the user may be prompted to provide inputs as shown in Table 3 above, optionally in Table 4 above to add success parameters, and optionally in Table 5 above to add a job name and identifier for running a test. A user may select to authorize virtual machine images assigned to a service after a successful test or to leave images unauthorized even after a successful test. Tests may include HTTP tests, Netconf tests, and Ansible tests, for some examples.

Figure 5:
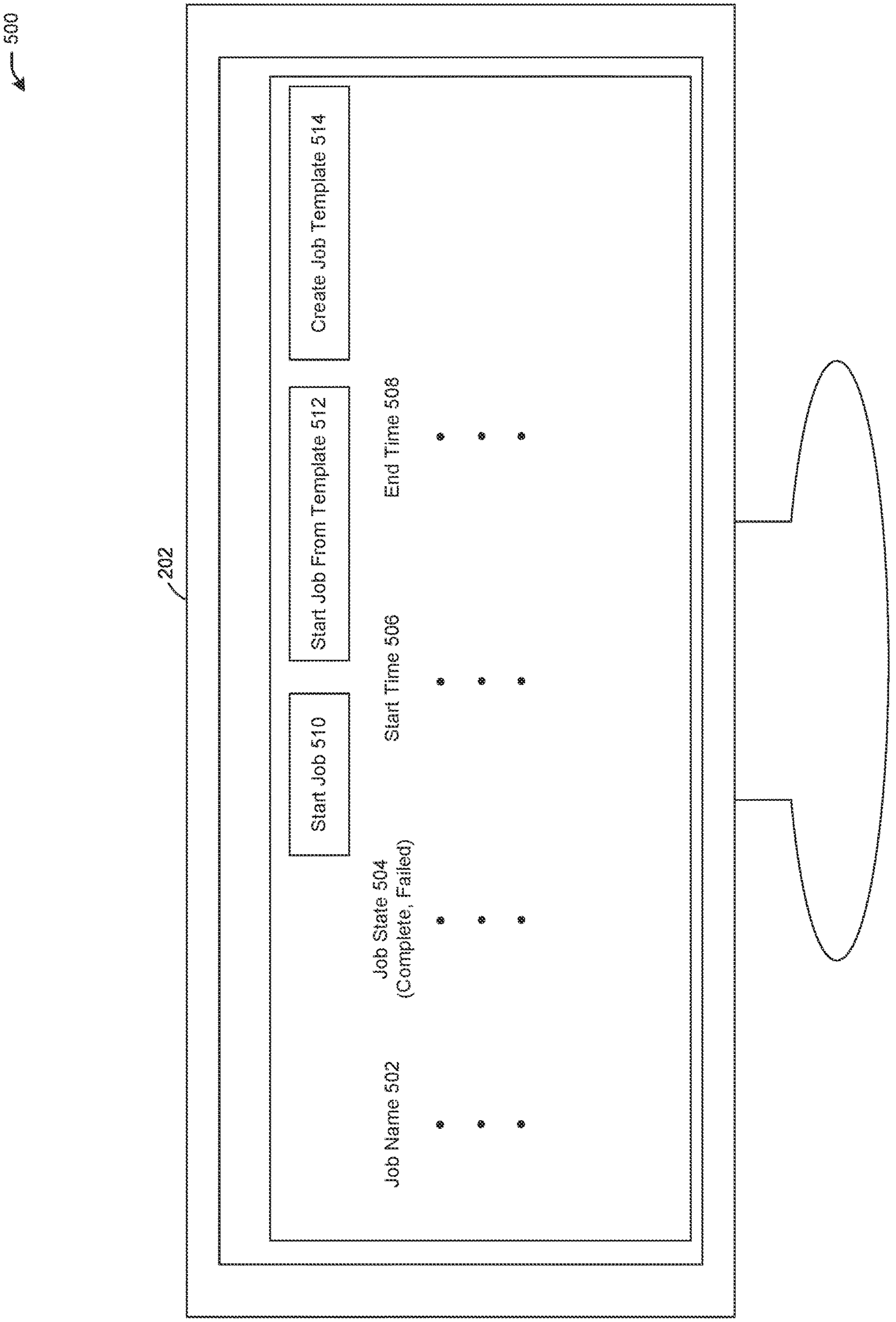
FIG. 5 shows an example jobs interface of a system for testing virtual network functions with edge gateway devices, in accordance with one embodiment.

FIG. 5 shows an example jobs interface 500 of a system for testing virtual network functions with edge gateway devices, in accordance with one embodiment.

Referring to FIG. 5, the jobs interface 500 may be presented using the VNF testing modules 114 of FIG. 1 to allow users to view job details and logs. For example, jobs may include actions such as downloading an image to use for an instance and instantiating a service. If errors occur when downloading an image or instantiating a service, for example, the job details or logs may indicate what caused the error. The jobs interface 500 may show a job name, a job state (e.g., complete, failed, in progress, etc.), and job start and end times. Job logs may show debug items, information items, warning items, and error items, for example. From the jobs interface 500, a user may start a job, which may or may not be defined by a template, and to create a job template define a job and when to perform the job. The fields in Table 15 above show the user inputs that a user may be prompted to provide upon creating a job. Table 16 above shows the fields that a user may be prompted to provide upon creating a job template.

Figure 6:
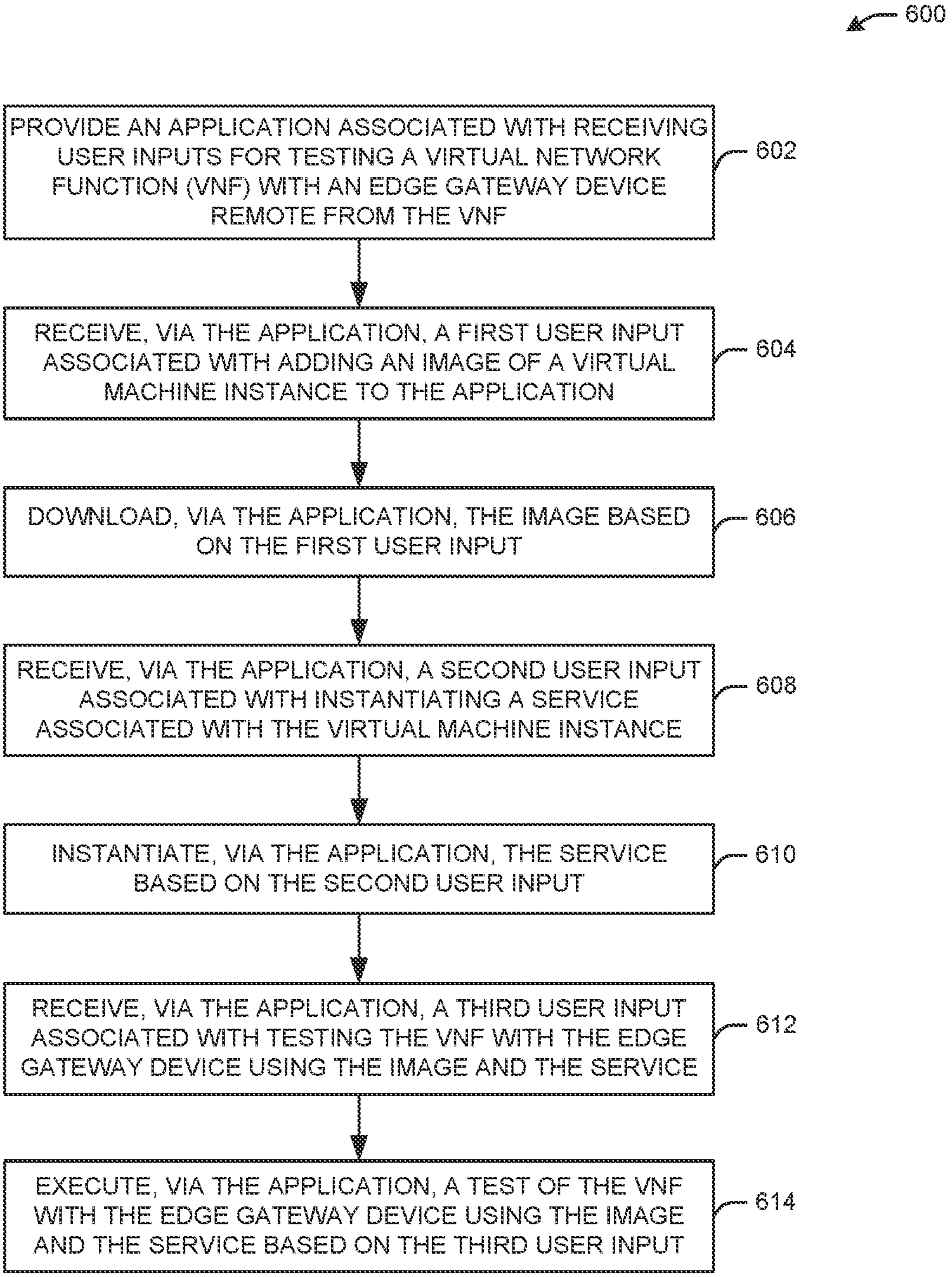
FIG. 6 is a flow for a process for testing virtual network functions with edge gateway devices, in accordance with one embodiment.

FIG. 6 is a flow for a process 600 for testing virtual network functions with edge gateway devices, in accordance with one embodiment.

At block 602, a device (e.g., the remote service 116) may provide an application (e.g., represented by the VNF testing modules 114 of FIG. 1) associated with receiving user inputs for testing a VNF function (e.g., the VNF 108 of FIG. 1) with an edge gateway device (e.g., the host devices 112) remote from the VNF (e.g., in a testing environment remote from the customer premises where the VNF resides).

At block 604, the device may receive, via the application (e.g., the dashboard interface 200 of FIG. 2), a first user input associated with adding an image of a virtual machine to the application. Table 1 above shows fields that a user may input when requesting to add a virtual machine instance image, such as a name for the image, an address (e.g., a URL), the checksum and checksum type, the type of host device (e.g., of the host devices 112 of FIG. 1), and the computer resources needed (e.g., CPU, memory, etc.). The user also may create and name a job for adding an image.

At block 606, the device may download, via the application, the image based on the first user input. In particular, the user may provide an address (e.g., URL) when inputting the first user input, the address representing a location from which the device may download the image.

At block 608, the device may receive, via the application (e.g., the services interface 300 of FIG. 3), a second user input associated with instantiating a service associated with the virtual machine instance. When a user requests to instantiate a service from the services interface 300, the user may be prompted to input a service name and description, along with other fields as shown in Table 2 above.

At block 610, the device may instantiate, via the application, based on the second user input, the service. Instantiation may depend on the selected instance, edge gateway environment for instantiation, script, VNF type, and image provided by the user via the application.

At block 612, the device may receive, via the application (e.g., the test interface 400 of FIG. 4), a third user input associated with testing the VNF with the edge gateway device using the image and the service inputted by the user. When a user requests to run a test, the user may be prompted to provide inputs as shown in Table 3 above, optionally in Table 4 above to add success parameters, and optionally in Table 5 above to add a job name and identifier for running a test. A user may select to authorize virtual machine images assigned to a service after a successful test or to leave images unauthorized even after a successful test. Tests may include HTTP tests, Netconf tests, and Ansible tests, for some examples.

At block 614, the device may execute, via the application, the test of the VNF with the edge gateway device using the user-provided image and selected service based on the third user input. When executing a test, the selected edge gateway device may be configured according to the user inputs and virtual machine configuration without the selected edge gateway device needing to be at the customer premises. In this manner, the VNF test may be run remotely.

It is understood that the above descriptions are for purposes of illustration and are not meant to be limiting.

Figure 7:
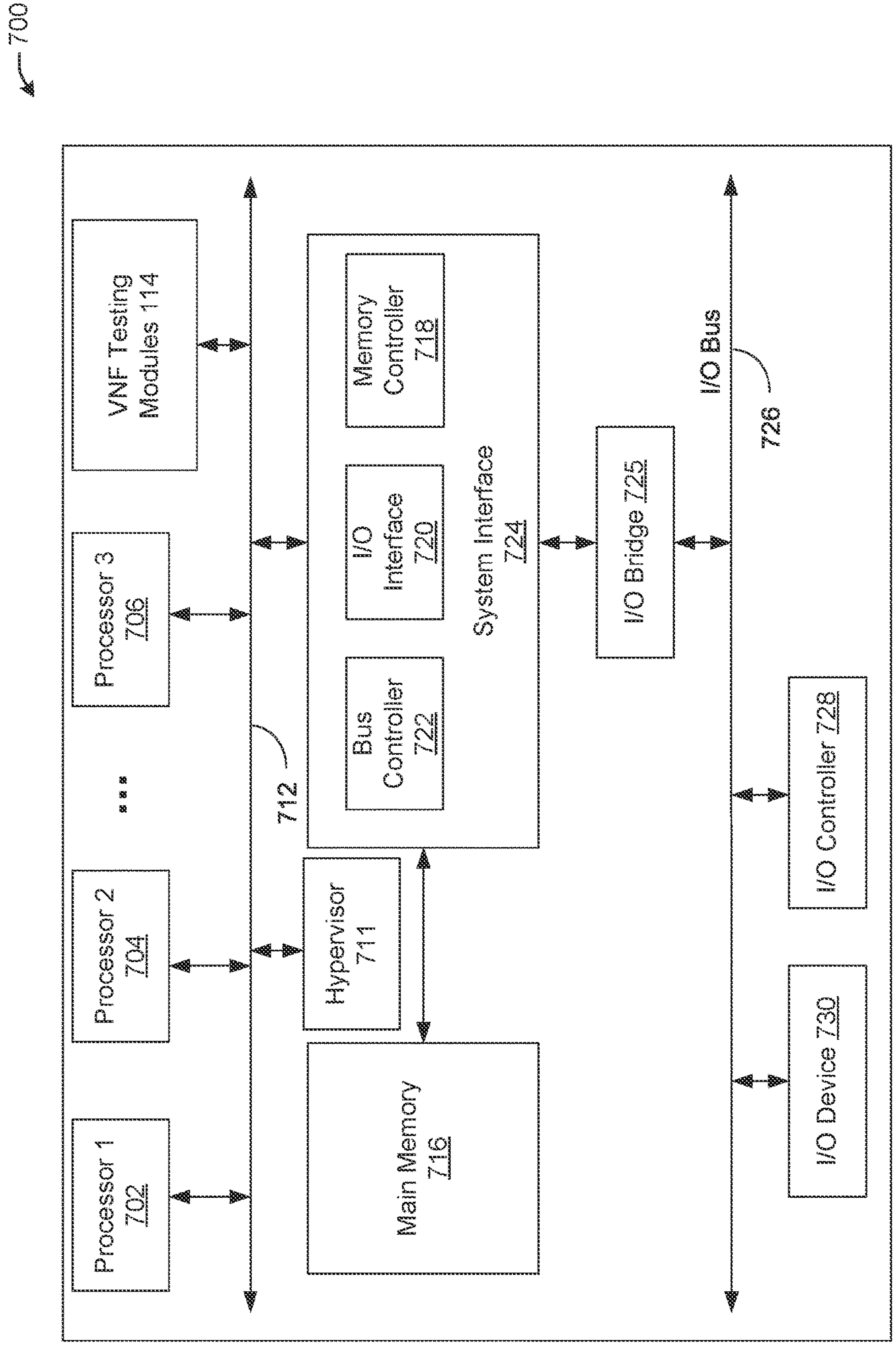
FIG. 7 is a diagram illustrating an example of a computing system that may be used in implementing embodiments of the present disclosure.

FIG. 7 is a block diagram illustrating an example of a computing device or computer system 700 which may be used in implementing the embodiments of the components of the network disclosed above. For example, the computing system 700 of FIG. 7 may represent at least a portion of the system 100 shown in FIG. 1, as discussed above. The computer system (system) includes one or more processors 702-706, the VNF testing modules 114 of FIG. 1, and a hypervisor 711 for facilitating VNFs. Processors 702-706 may include one or more internal levels of cache (not shown) and a bus controller 722 or bus interface unit to direct interaction with the processor bus 712. Processor bus 712, also known as the host bus or the front side bus, may be used to couple the processors 702-706 with the system interface 724. System interface 724 may be connected to the processor bus 712 to interface other components of the system 700 with the processor bus 712. For example, system interface 724 may include a memory controller 718 for interfacing a main memory 716 with the processor bus 712. The main memory 716 typically includes one or more memory cards and a control circuit (not shown). System interface 724 may also include an input/output (I/O) interface 720 to interface one or more I/O bridges 725 or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system outlined in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 716, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method for remotely testing virtual network functions with edge gateway devices, the method comprising:

providing, by at least one processor, an application associated with receiving user inputs for testing a virtual network function (VNF) with an edge gateway device remote from the VNF;

receiving, by the at least one processor, via the application, a first user input associated with adding an image of a virtual machine instance to the application;

downloading, by the at least one processor, via the application, the image based on the first user input;

receiving, by the at least one processor, via the application, a second user input associated with instantiating a service associated with the virtual machine instance;

instantiating, by the at least one processor, via the application, the service based on the second user input;

receiving, by the at least one processor, via the application, a third user input associated with testing the VNF with the edge gateway device using the image and the service;

generating, via the application, based on a fourth user input, a job template comprising parameters to use when executing a test; and executing, by the at least one processor, via the application, the test of the VNF with the edge gateway device using the image and the service based on the third user input, wherein executing the test is based on the job template.

2. The method of claim 1, further comprising:

receiving, via the application, the fourth user input indicative of a checksum associated with verifying the image; and verifying the image, via the application, using the checksum, wherein the checksum is unique to the image.

3. The method of claim 1, further comprising:

receiving, via the application, the fourth user input indicative of a type of the edge gateway device, wherein the image is based on the type of the edge gateway device.

4. The method of claim 1, wherein the service comprises at least one of the following:

a single router, a router and any of a firewall, a session border controller, a monitor, or an information technology payload, or multiple standalone information technology payloads.

5. The method of claim 1, further comprising:

identifying, via the application, a uniform resource locator associated with viewing a console of the VNF, wherein executing the test is based on the uniform resource locator.

6. The method of claim 1, wherein the test is a hypertext transfer protocol (HTTP) test associated with a request port and a uniform resource locator, wherein executing the test is based on the uniform resource locator and the request port.

7. The method of claim 1, wherein the test is a Netconf test using a Netconf template, wherein executing the test is based on the Netconf template.

8. The method of claim 1, wherein the test is an Ansible test using an Ansible playbook, wherein executing the test is based on the Ansible playbook.

9. The method of claim 1, further comprising:

receiving, via the application, the fourth user input to authorize the image, wherein authorizing the image is indicative of the image being tested and approved based on executing the test.

10. The method of claim 1, further comprising:

presenting, via the application, details associated with the image, the details comprising a download location, a download start time, a download end time, an authorization state, a host type of the edge gateway device, and a checksum associated with verifying the image.

11. A system for remotely testing virtual network functions with edge gateway devices, the system comprising memory coupled to at least one processor, the at least one processor configured to:

provide an application associated with receiving user inputs for testing a virtual network function (VNF) with an edge gateway device remote from the VNF;

receive, via the application, a first user input associated with adding an image of a virtual machine instance to the application;

download, via the application, the image based on the first user input;

receive, via the application, a second user input associated with instantiating a service associated with the virtual machine instance;

instantiate, via the application, the service based on the second user input;

receive, via the application, a third user input associated with testing the VNF with the edge gateway device using the image and the service;

generate, via the application, based on a fourth user input, a job template comprising parameters to use when executing a test; and execute, via the application, the test of the VNF with the edge gateway device using the image and the service based on the third user input, wherein executing the test is based on the job template.

12. The system of claim 11, wherein the at least one processor is further configured to:

receive, via the application, the fourth user input indicative of a checksum associated with verifying the image; and verify the image, via the application, using the checksum, wherein the checksum is unique to the image.

13. The system of claim 11, wherein the at least one processor is further configured to:

receive, via the application, the fourth user input indicative of a type of the edge gateway device, wherein the image is based on the type of the edge gateway device.

14. The system of claim 11, wherein the service comprises at least one of the following:

a single router, a router and any of a firewall, a session border controller, a monitor, or an information technology payload, or multiple standalone information technology payloads.

15. The system of claim 11, wherein the at least one processor is further configured to:

identify, via the application, a uniform resource locator associated with viewing a console of the VNF, wherein executing the test is based on the uniform resource locator.

16. The system of claim 11, wherein the test is a hypertext transfer protocol (HTTP) test associated with a request port and a uniform resource locator, wherein executing the test is based on the uniform resource locator and the request port.

17. The system of claim 11, wherein the test is a Netconf test using a Netconf template, wherein executing the test is based on the Netconf template.

18. The system of claim 11, wherein the test is an Ansible test using an Ansible playbook, wherein executing the test is based on the Ansible playbook.

19. A non-transitory computer-readable storage medium comprising instructions to cause at least one processor for remotely testing virtual network functions with edge gateway devices, upon execution of the instructions by the at least one processor, to:

provide an application associated with receiving user inputs for testing a virtual network function (VNF) with an edge gateway device remote from the VNF;

receive, via the application, a first user input associated with adding an image of a virtual machine instance to the application;

download, via the application, the image based on the first user input;

receive, via the application, a second user input associated with instantiating a service associated with the virtual machine instance;

instantiate, via the application, the service based on the second user input;

receive, via the application, a third user input associated with testing the VNF with the edge gateway device using the image and the service;

generate, via the application, based on a fourth user input, a job template comprising parameters to use when executing a test; and execute, via the application, the test of the VNF with the edge gateway device using the image and the service based on the third user input, wherein executing the test is based on the job template.

* * * * *